United States Patent
Van Der Poel et al.

(10) Patent No.: US 9,609,847 B2
(45) Date of Patent: Apr. 4, 2017

(54) ANIMAL WATERING DEVICE

(71) Applicant: DELAVAL HOLDING AB, Tumba (SE)

(72) Inventors: Hans Van Der Poel, Tumba (SE); Nicolas Tillet, Tumba (SE)

(73) Assignee: DELAVAL HOLDING AB, Tumba (SE)

( * ) Notice: Subject to any disclaimer, the term of this patent is extended or adjusted under 35 U.S.C. 154(b) by 103 days.

(21) Appl. No.: 14/429,472

(22) PCT Filed: Oct. 14, 2013

(86) PCT No.: PCT/SE2013/051197
§ 371 (c)(1),
(2) Date: Mar. 19, 2015

(87) PCT Pub. No.: WO2014/062120
PCT Pub. Date: Apr. 24, 2014

(65) Prior Publication Data
US 2015/0237826 A1    Aug. 27, 2015

Related U.S. Application Data

(60) Provisional application No. 61/714,809, filed on Oct. 17, 2012.

(30) Foreign Application Priority Data

Oct. 17, 2012    (SE) ...................................... 1251180

(51) Int. Cl.
*A01K 7/02*    (2006.01)
*A01K 39/02*    (2006.01)
*H01M 10/46*    (2006.01)

(52) U.S. Cl.
CPC ................ *A01K 7/02* (2013.01); *A01K 39/02* (2013.01); *H01M 10/46* (2013.01)

(58) Field of Classification Search
CPC .......... A01K 7/02; A01K 7/025; A01K 39/02; H01M 10/46
See application file for complete search history.

(56) References Cited

U.S. PATENT DOCUMENTS 2,511,721 A * 6/1950 Langenbahn ............ A01K 7/04
119/73
3,169,510 A * 2/1965 Fulton, Jr. .............. A01K 7/025
119/73

(Continued)

FOREIGN PATENT DOCUMENTS

CN    201523595 U    7/2010
DE    43 30 372 A1    7/1995

(Continued)

OTHER PUBLICATIONS

International-Type Search Report, dated Apr. 18, 2013, from corresponding PCT application.

(Continued)

*Primary Examiner* — Stanton L Krycinski
(74) *Attorney, Agent, or Firm* — Young & Thompson

(57) ABSTRACT

An animal watering device includes a trough for holding water, a water conduit system in fluid communication with the trough and arranged to be connected to a water supply, an electric power consuming water level control system including a controller and at least one water level sensor arranged to sense a water level in the trough, and an electric power unit is provided. The electric power unit includes an electric generator and an electrically chargeable unit. The water level control system is connected to the electrically chargeable unit. The electric generator is connected to the (Continued)

water conduit system. The electric generator is arranged to be driven by water from the water supply and to charge the electrically chargeable unit.

20 Claims, 4 Drawing Sheets

(56) References Cited

U.S. PATENT DOCUMENTS

| | | | | |
|---|---|---|---|---|
| 3,371,652 A | * | 3/1968 | Louks | A01K 7/04 119/51.11 |
| 3,921,587 A | | 11/1975 | Schnee | |
| 4,269,147 A | * | 5/1981 | Vorbeck | A01K 7/02 119/73 |
| 4,298,022 A | * | 11/1981 | Walters | A01K 7/025 119/73 |
| 4,320,720 A | | 3/1982 | Streed | |
| 4,744,334 A | * | 5/1988 | McAnally | A01K 7/00 119/78 |
| 5,052,343 A | * | 10/1991 | Sushelnitski | A01K 7/02 119/74 |
| 5,813,363 A | | 9/1998 | Snelling | |
| 6,050,779 A | | 4/2000 | Nagao et al. | |
| 6,497,197 B1 | * | 12/2002 | Huisma | A01K 5/02 119/75 |
| 6,877,170 B1 | | 4/2005 | Quintana et al. | |
| 7,762,212 B2 | * | 7/2010 | Drouillard | A01K 7/00 119/72 |
| 9,232,768 B2 | * | 1/2016 | Knurr | A01K 7/02 |
| 2003/0213437 A1 | * | 11/2003 | Norris | A01K 7/02 119/74 |
| 2008/0257274 A1 | | 10/2008 | Drouillard et al. | |

FOREIGN PATENT DOCUMENTS

| | | |
|---|---|---|
| FR | 2 683 703 A1 | 5/1993 |
| KR | 20100033236 A | 3/2010 |
| RU | 2 057 437 C1 | 4/1996 |
| SU | 1189406 A | 11/1985 |
| SU | 1306532 A1 | 4/1987 |

OTHER PUBLICATIONS

International Search Report, dated Dec. 10, 2013, from corresponding PCT application.

Supplementary International Search Report, dated Dec. 26, 2014, from corresponding PCT application.

* cited by examiner

ANIMAL WATERING DEVICE

TECHNICAL FIELD

The present invention relates to animal watering devices comprising a trough for holding water.

BACKGROUND

Animal watering devices are used for watering animals. Devices of various sizes are known. For animal watering devices in sizes suitable for e.g. livestock, horses, pigs, and sheep, i.e. animal watering devices not particularly directed to pets, it is desirable that the watering devices are automatically refilled. Other functions such as automatic draining and automatic cleaning of the animal watering device may also be provided.

U.S. Pat. No. 3,921,587 discloses a self filling and self cleaning water fountain for bovine animals. Water is dispensed into a water tank of the fountain adjacent an upper edge of interior sides to wash the sides during each water fill operation. The washing water urges any sediment or debris adjacent the sides into the body of water, wherein it will settle on the bottom of the tank. The surface of the bottom undulates so as to urge the settled sediment and debris to accumulate in the troughs of the bottom surface, formed by the undulations. Each trough is drained via a separate drain through which the accumulated settled sediment and debris is exhausted.

U.S. Pat. No. 5,813,363 discloses an automatic dispenser for providing animals with cool fresh liquid (e.g., water). The feeder has self-cleaning and self-refilling features that provide periodic replacement of hot, stale or dirty fluid with cool fresh refills. Solenoid valves are controlled by one or more liquid sensors, a time delay relay, timer and optional thermostat to provide flexibility and customizing of drain/refill cycles as desired in order to reflect varying ambient conditions in which the equipment is operated.

US 2008/257274 discloses a self-cleaning, water-saving automated animal watering device which includes a watering tank moveable between a lower, water-full condition and an upper, water-low condition. One end of the tank is pivotally supported by a pivot shaft, while the other end of the tank is biased upwardly via a lower lift spring. The device also has a water fill assembly operably coupled with tank to selectively fill the tank when needed, and a drain valve assembly also coupled with tank in order to completely drain the tank on a periodic basis. A control assembly is coupled with at least the tank and drain valve assembly, and is operable to actuate the drain valve assembly after a predetermined number of movements of the tank between the elevated and lowered positions thereof.

CN 201523595 U discloses an automatic portable watering trough, which comprises a power generating device. The power generating device provides energy to a pump for pumping water into a trough of the automatic portable watering trough. Also, the power generating device supplies electricity for daily life of herdsmen. It appears from drawings in the document CN 201523595 U that the power generating device may comprise a solar panel and/or a wind-powered generator.

SUMMARY

An object of the invention is to provide an animal watering device comprising a water level control system, which animal watering device is usable in a location without an electric power connection.

According to an aspect of the invention, the object is achieved by an animal watering device comprising a trough for holding water, a water conduit system in fluid communication with the trough and arranged to be connected to a water supply, an electric power consuming water level control system comprising a controller and at least one water level sensor arranged to sense a water level in the trough. The animal watering device further comprises an electric power unit. The electric power unit comprises an electric generator and an electrically chargeable unit. The water level control system is connected to the electrically chargeable unit. The electric generator is connected to the water conduit system. The electric generator is arranged to be driven by water from the water supply and to charge the electrically chargeable unit.

Since the electric power unit comprises an electric generator arranged to be driven by water from the water supply and to charge the electrically chargeable unit, the above mentioned object is achieved. In this manner a water level in the trough may be controlled utilizing the electric power provided by the electric power unit. The water level sensor may e.g. be used for sensing a water level in the trough, to be used in connection with filling and/or draining the trough.

The inventor has realized that an animal watering device, not requiring to power a water pump, may be self-supplying with electric power from an electric generator driven by water from a water supply connected to the animal watering device. It has been realized that the electric energy generated in this way is sufficient to power an electrically powered water level control system. The electric power unit and in particular the electric generator thereof simply relies on the water pressure of the incoming water from the water supply. The water supply may be provided e.g. by water mains, a built water reservoir, or a natural water reservoir such as a lake or a river. The water mains, or a height difference between the animal watering device and a water reservoir, provides the water pressure required to drive the electric generator. A main criterion for the water supply is that the water supplied is suitable for animals to drink.

The animal watering device may be of a size suitable for one animal only, or a number of animals simultaneously, drinking from its trough. The trough is a container which allows animals to drink therefrom. The animal watering device may comprise a support for the trough. The animal watering device may be placed indoors e.g. in an animal shed, or outdoors e.g. in a pasture. The animal watering device has to be connected to a water supply but other than that the animal watering device may be a stand-alone device. Alternatively, the animal watering device may be a built-in device of a construction such as a wall, a manger, or other feeding construction.

According to embodiments, the water level control system may comprise a timer. In this manner the water level in the trough may be controlled not only based on the water level but also, or alternatively, based on time. The timer may be implemented as a function in the controller.

According to embodiments, the at least one water level sensor may comprise a low level sensor arranged to sense a low water level in the trough. This enables drainage of the trough only when the water level in the trough is low.

According to embodiments, the at least one water level sensor may comprise a top level sensor arranged to sense a top water level in the trough. This enables filling of the trough to a predefined top water level.

According to embodiments, the at least one water level sensor may comprise a middle level sensor arranged to sense a middle water level in the trough. In this manner the water level in the trough may be more precisely controlled.

According to embodiments, the animal watering device may comprise a water outlet arranged at a bottom portion of the trough, and an outlet valve arrangement associated with the water outlet. In this manner the water level in the trough may be controlled. The trough may be drained via the water outlet, which may be opened and closed by means of the outlet valve arrangement.

According to embodiments, the water level control system may be arranged to open the water outlet when a first time interval has expired and a water level in the trough is at or below the low level sensor. In this manner it may be ensured that the trough is drained only when the water level in the trough is low. The water outlet may be opened by the outlet valve arrangement.

It has been realized by the inventors that willingness of animals to drink clean water and refusal to drink soiled water may be used for minimizing waste of water when draining an animal watering device, i.e. to drain soiled water in order to fill the trough with clean water. Thus, the controller of the water level control system may be set to actuate the outlet valve arrangement to open the water outlet only when a first time interval has expired and a water level in the trough is low. If the first time interval has expired and the water level in the trough is above the low level sensor, the trough is not drained and the animals may continue to drink water from the trough until the water level is at or below the low level sensor. Only then the trough is drained.

If however the water is soiled to such a degree that animals will not drink from the trough, an expiry of a second time interval will cause the controller to open the water outlet and drain the trough despite there not being a low water level in the trough.

Accordingly, according to embodiments the water level control system may be arranged to open the water outlet when a second time interval has expired.

According to embodiments, the water level control system may be arranged to maintain the water outlet open during a third time interval. In this manner it may be ensured that the trough is completely drained.

According to embodiments, the water conduit system may be connected to an inlet nozzle arrangement. In this manner water may be directed into the trough via the inlet nozzle arrangement, the inlet arrangement leading into the trough. The inlet nozzle arrangement may comprise a first nozzle. The inlet nozzle arrangement may further comprise one or more second nozzles.

According to embodiments, the water level control system may be arranged to open the inlet nozzle arrangement during at least a part of the third time interval. In this manner the trough may be rinsed with clean water during draining of the trough.

According to embodiments, the water level control system may be arranged to open the inlet nozzle arrangement when a water level in the trough is at or below the low level sensor. In this manner the trough may be replenished with water when there is a low water level in the trough.

According to embodiments, the water level control system may be arranged to close the inlet nozzle arrangement when a water level in the trough is at or above the top level sensor.

According to embodiments, the water level control system may be arranged to open the inlet nozzle arrangement when a water level in the trough is at or below the middle level sensor. In this manner the trough may be replenished with water when there is a water level in the trough indicated by the middle water level sensor. When the water level is at or below the middle level sensor, the trough may be replenished with water. If the middle level sensor is used in this manner, after expiry of the first time interval, the trough is not replenished with water when the water level in the trough is at or below the middle level sensor.

According to embodiments, the outlet valve arrangement may comprise a valve body and a hydraulic cylinder connected to the valve body. In this manner the hydraulic cylinder may be utilized for opening and closing the water outlet of the trough.

According to embodiments, the valve body may comprise a lid. The lid may be provided to close the water outlet and may be manoeuvred by the hydraulic cylinder. Since a lid provides a distinct opening and closing of the water outlet, it may be ensured that the outlet valve arrangement is not blocked or hampered in its function by debris from the trough being caught in the outlet valve arrangement.

According to embodiments, the water conduit system may be connected to the hydraulic cylinder. In this manner the outlet valve arrangement may be actuated by water pressure. The controller may direct water to different chambers of the hydraulic cylinder, e.g. by means of one or more valves in the water conduit system.

According to embodiments, the electrically chargeable unit may be a rechargeable battery. Alternatively, the electrically chargeable unit may be e.g. a capacitor.

According to embodiments, the trough may comprise a bottom portion having a longitudinal direction and the bottom portion may be provided with a rib protruding from the bottom portion. The rib may be provided in a middle portion of the bottom portion and may extend substantially in the longitudinal direction. In this manner any debris in the water may deposit on both sides of the rib, which may facilitate draining the debris from the trough.

Further features of, and advantages with, the present invention will become apparent when studying the appended claims and the following detailed description. Those skilled in the art will realize that different features of the present invention may be combined to create embodiments other than those described in the following, without departing from the scope of the present invention, as defined by the appended claims.

BRIEF DESCRIPTION OF THE DRAWINGS

Various aspects of the invention, including its particular features and advantages, will be readily understood from the following detailed description and the accompanying drawings, in which.

DETAILED DESCRIPTION

The present invention will now be described more fully with reference to the accompanying drawings, in which example embodiments are shown. However, this invention should not be construed as limited to the embodiments set forth herein. Disclosed features of example embodiments may be combined as readily understood by one of ordinary skill in the art to which this invention belongs. Like numbers refer to like elements throughout. Well-known functions or constructions will not necessarily be described in detail for brevity and/or clarity.

Figure 1:
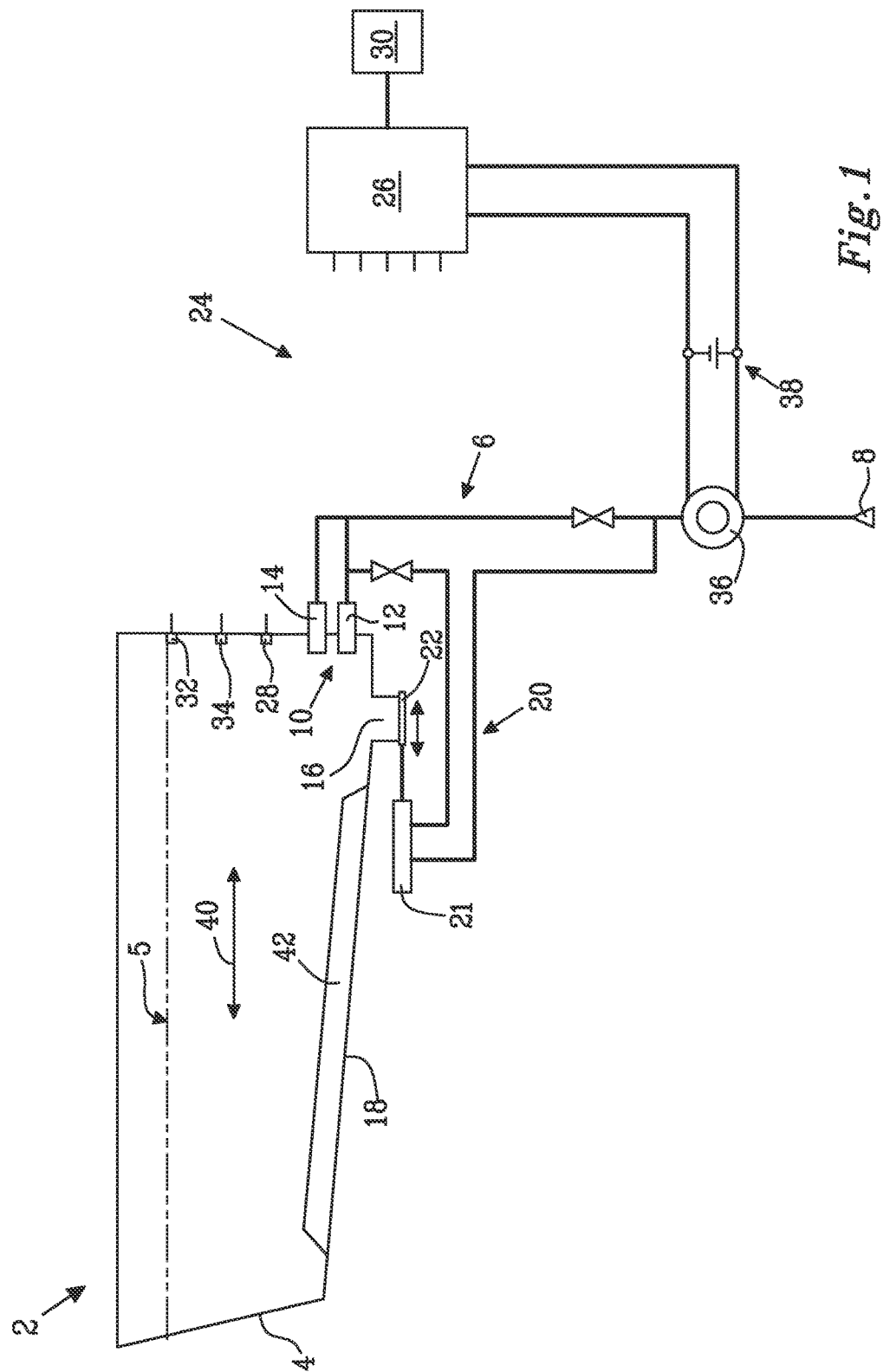
FIG. 1 illustrates schematically a side view cross-section through an animal watering device according to embodiments.

FIG. 1 illustrates schematically a side view cross-section through an animal watering device 2 according to embodiments. The animal watering device 2 comprises a trough 4 for holding water as indicated by a water level 5. The animal watering device 2 also comprises a water conduit system 6 in fluid communication with the trough 4 and arranged to be connected to a water supply 8. Purely as an example it may be mentioned that the water pressure in the water conduit system 6 emanating from the water supply 8 may be about 1 bar, which pressure may be suitable e.g. for opening valves, setting hydraulic cylinders and filling or replenishing the trough 4. The water conduit system 6 is connected to an inlet nozzle arrangement 10. The inlet nozzle arrangement 10 may comprise one or more nozzles. In the illustrated embodiments the inlet nozzle arrangement 10 comprises a first nozzle 12 and a second nozzle 14. The inlet nozzle arrangement 10 is provided at the trough 4 such that the nozzle/s is/are directed into the trough 4 for admitting water through the nozzle/s into the trough 4.

The animal watering device 2 further comprises a water outlet 16 arranged at a bottom portion 18 of the trough 4, and an outlet valve arrangement 20 associated with the water outlet 16. The outlet valve arrangement 20 comprises a hydraulic cylinder 21 and a valve body 22. The hydraulic cylinder 21 is connected to the valve body 22. The hydraulic cylinder 21 is arranged to actuate the valve body 22 in order to open and close the water outlet 16. The water conduit system 6 is connected to the hydraulic cylinder 21. Thus, by directing water from the water supply to different chambers of the hydraulic cylinder 21, a piston of the hydraulic cylinder 21 may be actuated and the valve body 22 may be moved to open or close the water outlet 16.

A water level control system 24 is provided for controlling the animal watering device 2. For instance, filling and draining of the trough 4 may be controlled by the water level control system 24. The water level control system 24 comprises a controller 26, and a low level sensor 28 arranged to sense a low water level in the trough 4. That is, the low level sensor 28 is arranged inside the trough 4 and senses when the water level in the trough 4 is at or above the low level sensor 28. The controller 26 may for instance comprise a central processing unit running one or more control programs stored in a memory, discrete logic circuits, or a specifically designed ASIC (application-specific integrated circuit). The low level sensor 28 is connected to the controller 26. The controller 26 is further connected to one or more valves arranged in the water conduit system 6. The valves may be arranged to control water flow through the one or more nozzles of the inlet nozzle arrangement 10, control water directed to the chambers of the hydraulic cylinder 21, generally direct the flow of water in the water conduit system 6, etc. The controller 26 may control the valve/s based on signals from e.g. the low level sensor 28. For instance, the controller 26 may open a valve in the water conduit system 6 to replenish the trough 4 with water from the water source 8 through the water conduit system 6 and the nozzle inlet arrangement 10 when the water level 5 reaches the low level sensor 28.

The water level control system 24 further comprises a timer 30. The timer 30 may be a separate unit or in some embodiments it may be implemented directly in the controller 26, e.g. as one or more tasks programmed in the controller 26. The timer 30 may be utilized for measuring one or more time intervals. Such time intervals may be used e.g. in connection with draining, filling, and rinsing the trough 4. Purely as an example it may be mentioned that the water level control system 24 may be arranged to open the water outlet 16 by actuating the outlet valve arrangement 20 when a first time interval has expired in the timer 30 and a water level in the trough is at or below the low level sensor 28. Further, the water level control system 24 may be arranged to open the water outlet 16 by actuating the outlet valve arrangement 20 when a second time interval has expired. The second time interval always expires after the first time interval has expired. That is, if the second time interval is measured from the start of the first time interval, i.e. measuring of the first and second time intervals starts at the same time, the second time interval is longer that the first time interval. If the second time interval is measured from the end of the first time interval, the second time interval succeeds the first time interval. If measuring of the second time interval is started within the first time interval, the second time interval ends after the first time interval ends. The timer 30 may be reset e.g. in connection with draining the trough, e.g. when the water outlet 16 is opened or when the water outlet 16 is closed again after having been open, i.e. the timer 30 may be reset in connection with the expiry of the first time interval and the expiry of the second time interval.

The water level control system 24 further comprises a top level sensor 32 and a middle level sensor 34. The top level sensor 32 is arranged to sense a top water level in the trough 4. That is, the top level sensor 32 is arranged inside the trough 4 and senses when the water level in the trough 4 is at or above the top level sensor 32. The middle level sensor 34 is arranged to sense a middle water level in the trough 4. That is, the middle level sensor 34 is arranged inside the trough 4 and senses when the water level in the trough 4 is at or above the middle sensor 34. The second and middle level sensors 32, 34 are connected to the controller 26.

The animal watering device 2 comprises an electric generator 36 connected to an electrically chargeable unit 38. The electric generator 36 and electrically chargeable unit 38 form part of an electric power unit. The electric generator 36 is connected to the water conduit system 6, and is thus driven by water from the water supply flowing through the conduit system 6. Accordingly, the electric generator 36 comprises a rotor, which is driven by the water flowing in the water conduit system 6. The electric generator 36 is arranged to charge the electrically chargeable unit 38. The electrically chargeable unit 38 may comprise e.g. a chargeable battery. The electrically chargeable unit 38 is connected to the water level control system 24. Electric power from the electrically chargeable unit 38 may thus power the water level control system 24, in particular components of the water level control system 24, e.g. the controller 26, and sensors 28, 32, 34.

The trough 4 comprises the bottom portion 18. The trough 4 and the bottom portion 18 have a longitudinal direction 40. The longitudinal direction 40 extends along the longer of the two horizontal directions of the through 4. The water outlet 16 of the trough 4 is arranged at one end of the bottom portion 18, seen in the longitudinal direction 40. The bottom portion 18 is slanted towards the water outlet 16. Thus, it may be ensured that the trough 4 is completely drained when the water outlet 16 is opened. The bottom portion 18 is provided with a rib 42 protruding upwardly from the bottom portion 18. The rib 42 is provided in a middle portion of the bottom portion 18, seen both along and across the longitudinal direction 40. The rib 42 extends substantially in the longitudinal direction 40. Purely mentioned as an example, the trough 4 may be 2 meters long in the longitudinal direction 40, 60 cm wide, i.e. across the longitudinal direction 40, and 30 cm deep at its deep end. In a trough of such dimensions, the rib 42 may for instance have a length of 120-180 cm, a width of 0.5-25 cm close to the bottom portion 18, and a height of 3-10 cm. The rib 42 may have a wide base and a narrow top, e.g. as illustrated in FIG. 2.

Figure 2:
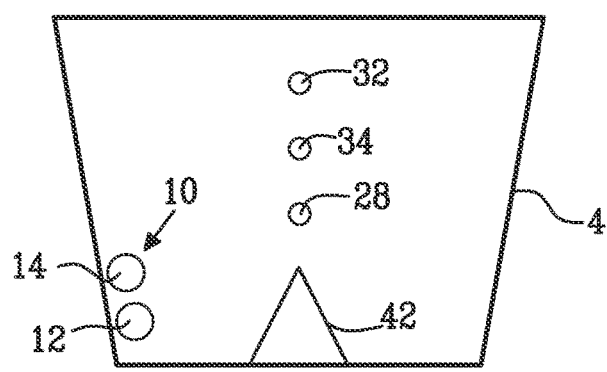
FIG. 2 illustrates a cross-section through the animal watering device illustrated in FIG. 1, FIGS. 3a and 3b illustrate an outlet valve arrangement of an animal watering device according to embodiments.

FIG. 2 illustrates a cross-section through the animal watering device 2 illustrated in FIG. 1, across the longitudinal direction 40. The nozzle arrangement 10 is arranged at one inner side of the trough 4. At least the first nozzle 12 of nozzle arrangement 10 is directed substantially in the longitudinal direction 40. Thus, water flowing into the trough 4 through the first nozzle 12 will be directed substantially in the longitudinal direction 40. Due to the arrangement of the rib 42 in the middle portion of the bottom portion 18 inflowing water from the first nozzle 12 will form a stream of water around the rib 42 to the water outlet 16. Purely as an example it may be mentioned that a water pressure of about 1.5 bar in the water conduit system 6 will ensure a strong stream around the rib 42 in a trough of the above exemplified size. When the water outlet 16 is open and the trough 4 is being drained, the water stream will ensure that debris is flushed out from the trough 4. Accordingly, the water outlet 16 may be opened during a third time interval and the water level control system 24 may be arranged to open the inlet nozzle arrangement 10 during at least a part of the third time interval. In this manner the trough 4 may be rinsed with clean water during draining of the trough 4. Furthermore, due to the rib 42 there is no stagnant water, and accordingly also no debris, at the middle portion of the bottom portion 18 as the water flows from the first nozzle 12 to the water outlet 16.

Figure 3A:
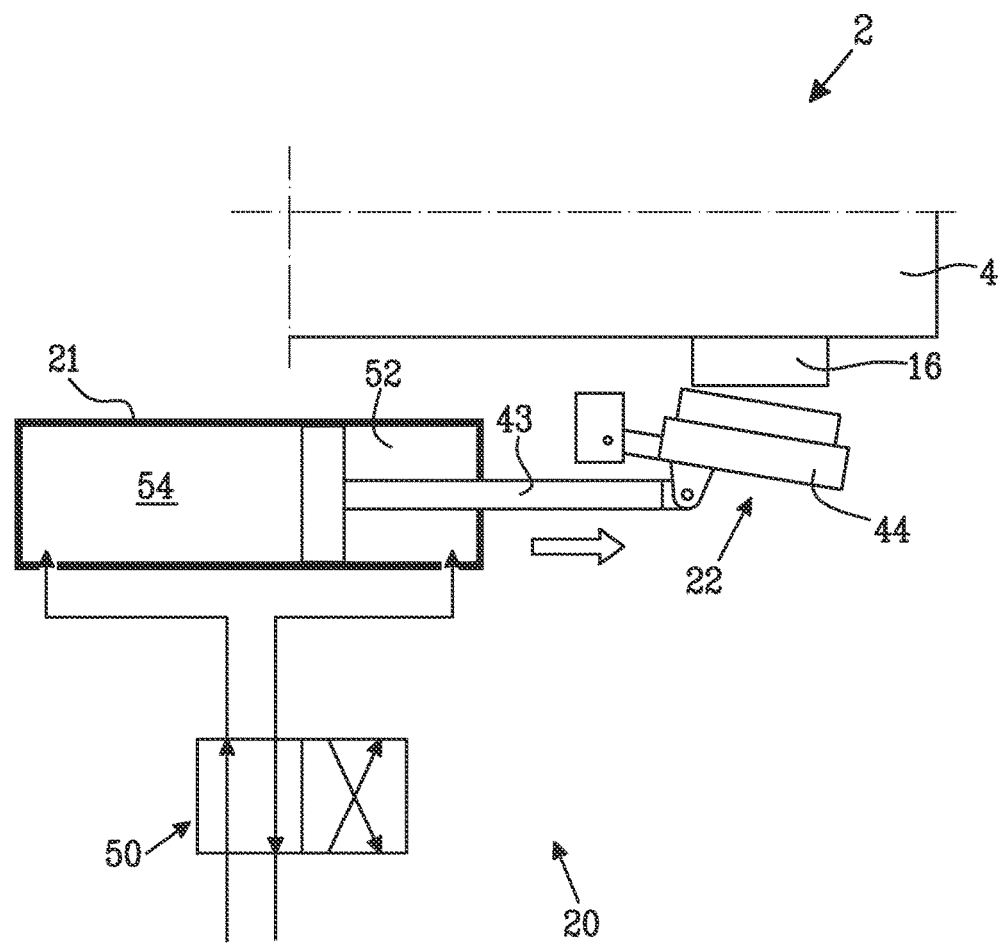
Figure 3B:
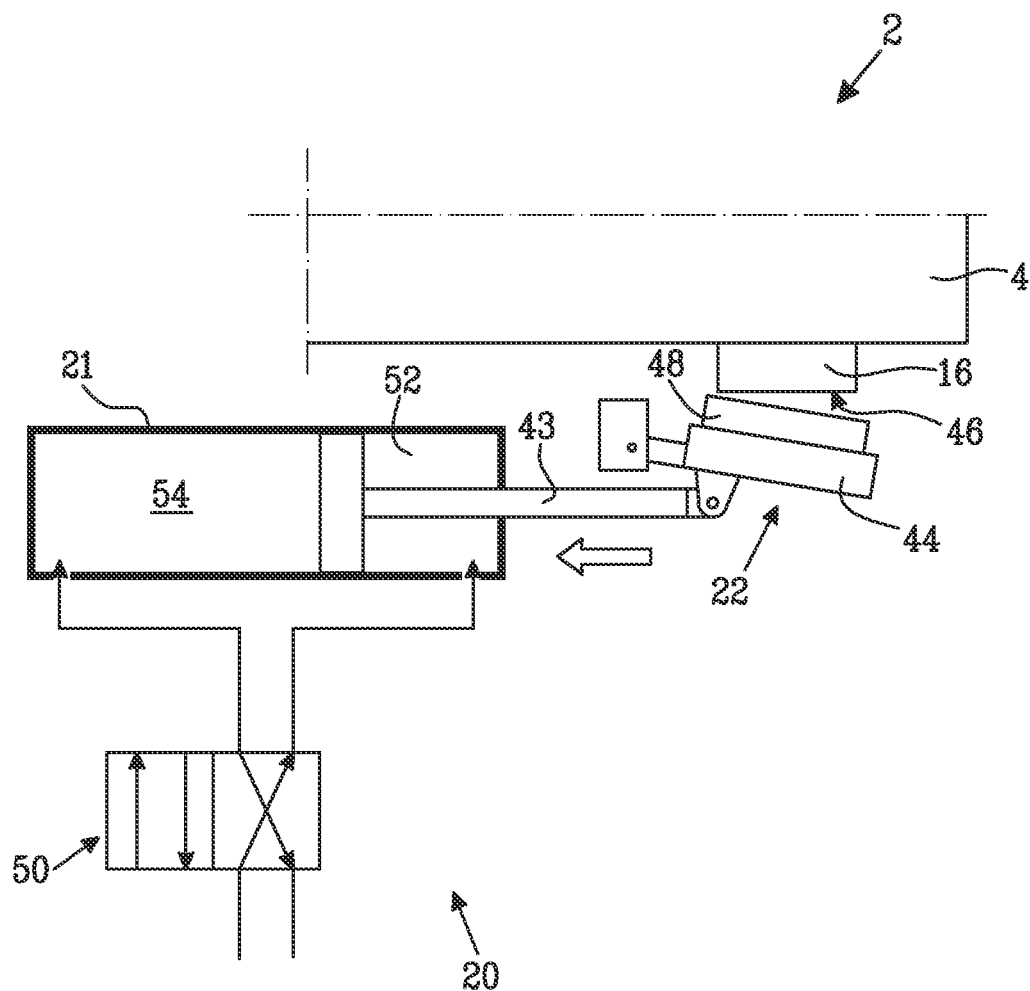

FIGS. 3a and 3b illustrate an outlet valve arrangement 20 of an animal watering device 2 according to embodiments. The animal watering device 2 may be an animal watering device 2 as illustrated and discussed in connection with FIGS. 1 and 2. The animal watering device 2 comprises a trough 4. The trough 4 is provided with a water outlet 16 arranged at a bottom portion of the trough 4. The outlet valve arrangement 20 is associated with the water outlet 16 and e.g. arranged for opening and closing the water outlet 16 and comprises a valve body 22 and a hydraulic cylinder 21 connected to the valve body 22. More specifically, a piston 43 of the hydraulic cylinder 21 is connected to the valve body 22. The valve body 22 comprises a lid 44 which is pivotably connected to the animal watering device 2. The lid 44 is arranged to close the water outlet 16. Accordingly, the lid 44 may be manoeuvred by the hydraulic cylinder 21. The lid 44 is arranged to abut against a rim 46 of the water outlet 16. The lid 44 may be provided with a rubber mat 48 which abuts against the rim 46 when the water outlet 16 is closed by the lid 44. The lid 44 provides a distinct opening and closing of the water outlet 16. Also, the arrangement of the lid 44 and the water outlet 16 being formed by an opening sufficiently large to permit debris in the form of straws and grass to flow out there through ensures that the outlet valve arrangement is not blocked or hampered in its function by such debris. Provided purely as an example, the water outlet 16 may have a through flow area of at least 200 mm$^2$, and the water outlet 16 may suitably be free from obstacles to ensure draining of debris.

The hydraulic cylinder 21 of the outlet valve arrangement 20 is connected to a water conduit system 6. The hydraulic cylinder 21 may thus be driven by the water pressure in the water conduit system 6. A control valve 50 of the outlet valve arrangement 20 for directing water from the water supply 8 to either one of two chambers 52, 54 of the hydraulic cylinder 21 is arranged in the water conduit system 6. Water from the respective chamber 52, 54 not being connected to the water supply 8 may be drained or directed into the trough 4. The two chambers 52, 54 are separated by the piston 43. The animal watering device 2 may comprise a water level control system as discussed in connection with FIGS. 1 and 2. The water level control system may be connected to the control valve 50 of the outlet valve arrangement 20. The water level control system thus may open and close the water outlet 16 by means of controlling the control valve 50 to direct water into one of the two chambers 52, 54 of the hydraulic cylinder 21. The outlet valve arrangement 20, or more specifically the control valve 50, may also be powered by electrically chargeable unit 38.

Figure 4:
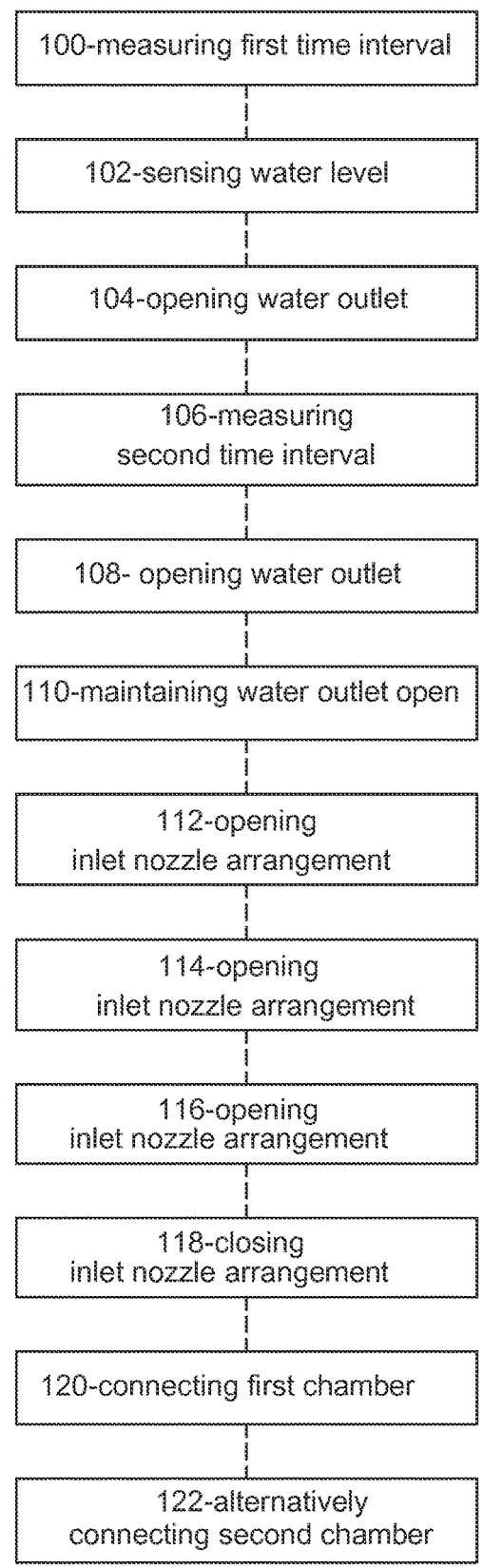
FIG. 4 illustrates a method of controlling an animal watering device as illustrated and discussed in connection with FIGS. 1, 2, 3a and 3b.

FIG. 4 illustrates a method of controlling an animal watering device 2 as illustrated and discussed in connection with FIGS. 1, 2, 3a and 3b.

The method comprises:
measuring 100 a first time interval,
sensing 102 a water level with the low level sensor 28,
opening 104 the water outlet 16 when the first time interval has expired and a water level in the trough 4 is at or below the low level sensor 28.

Accordingly, the water level control system 24 may be set to open the water outlet 16 only when a first time interval has expired and a water level in the trough 4 is low. Should the first time interval expire when the water level in the trough 4 is above the low level sensor 28, the trough 4 is not drained. Thus, animals may continue to drink water from the trough 4 until the water level is at or below the low level sensor 4. Only then the trough 4 is drained.

According to embodiments, the method may comprise:
measuring 106 a second time interval,
opening 108 the water outlet 16 when the second time interval has expired.

Accordingly, if the water is soiled to such a degree that animals will not drink from the trough 4 in any event, at expiry of the second time interval the water level control system 24 will open the water outlet 16 and drain the trough 4. The second time interval may e.g. be measured from the start of the first time interval or from the end of the first time interval.

According to embodiments, the method may comprise:
maintaining 110 the water outlet 16 open during a third time interval. It may thus be ensured that the trough 4 is emptied. The length of the third time interval is chosen based on the capacity of the trough 4 and size of the water outlet 16.

According to embodiments, the method may comprise:
opening 112 the inlet nozzle arrangement 10 during at least a part of the third time interval. Water flowing into the trough 4 will thus rinse the trough 4, e.g. to remove debris and/or to ensure that soiled water is rinsed out of the trough 4.

According to embodiments, the method may comprise:
opening 114 the inlet nozzle arrangement 10 when a water level in the trough 4 is at or below the low level sensor 28.

According to embodiments, the method may comprise: opening 116 the inlet nozzle arrangement 10 when a water level in the trough 4 is at or below the middle level sensor 34.

According to embodiments, the method may comprise: closing 118 the inlet nozzle arrangement 10 when a water level in the trough 4 is at or above the top level sensor 32.

Accordingly, filling or replenishing the trough 4 may be based on a water level sensed by the low level sensor 28. When the water level in the trough 4 is at or below the low level sensor, the inlet nozzle arrangement 10 may be opened. The inlet nozzle arrangement 10 may be maintained open during a time interval of predetermined length. Alternatively, the inlet nozzle arrangement 10 may be closed when the water level in the trough 4 reaches the top level sensor 32, as mentioned above. If the water level control system 24 comprises a middle level sensor 34 arranged to sense a middle water level in the trough 4, the trough 4 may instead be filled or replenished by opening the inlet nozzle arrangement 10 when the water level is at or below the middle level sensor 34, as mentioned above. Again, the inlet nozzle arrangement 10 may be maintained open during a time interval of predetermined length or the inlet nozzle arrangement 10 may be closed when the water level in the trough 4 reaches the top level sensor 32. If the water level control system 24 comprises a middle level sensor 34 used in this manner, after expiry of the first time interval, the sensor signal from the middle level sensor 34 is ignored by the water level control system 24. Thus, the trough 4 is not replenished with water when the water level in the trough 4 is below the middle level sensor 34. The opening 104 the water outlet 16 will take place once the water level in the trough 4 reaches the low level sensor 28, or after expiry of the second time interval.

The method may comprise:
connecting 120 the first chamber 52 of the hydraulic cylinder 21 via the water conduit system 6 to the water supply 8 to actuate the outlet valve arrangement 20. Thus, the piston 43 of the hydraulic cylinder 21 may be displaced by water entering the first chamber 52. By the displacement of the piston 43 the water outlet 16 of the through 4 is opened.

According to embodiments, the method may comprise:
connecting 122 the second chamber 54 via the water conduit system 5 to the water supply 8 to actuate the outlet valve arrangement 20. Thus, the piston 43 of the hydraulic cylinder 21 may be displaced by water entering the second chamber 54. By the displacement of the piston 43 the water outlet 16 of the through 4 is closed.

Example embodiments described above may be combined as understood by a person skilled in the art. Herein the terms filling and replenishing have the same practical meaning. It is also understood by those skilled in the art that the length of the first and second time intervals may be adapted to specific circumstances, which may e.g. take into account the volume of the trough, the number of animals being watered, the number of troughs available for watering the number of animals, environmental conditions such as presence of straws and dirt, the location of the trough, etc. As previously mentioned the pressure in the conduit system 6 may be e.g. 1 bar or 1.5 bar. The pressure in the conduit system 6 emanating from the water supply 8 may alternatively be e.g. 2-3 bar or higher. The first nozzle 12 may be arranged below the one or more second nozzles 14 as illustrated in FIGS. 1 and 2. Alternatively, the first nozzle may be arranged above the one or more second nozzles 14, or amidst one or more second nozzles 14, or laterally beside the one or more second nozzles 14. Although the invention has been described with reference to example embodiments, many different alterations, modifications and the like will become apparent for those skilled in the art. Therefore, it is to be understood that the foregoing is illustrative of various example embodiments and that the invention is defined only by the appended claims.

As used herein, the term "comprising" or "comprises" is open-ended, and includes one or more stated features, elements, steps, components or functions but does not preclude the presence or addition of one or more other features, elements, steps, components, functions or groups thereof.

It will be understood that when an element is referred to as "connected" to another element, it can be directly on, coupled or connected to the other element or intervening elements may also be present. In contrast, when an element would be referred to as being "directly connected" to another element, there are no intervening elements present.

The invention claimed is:

1. An animal watering device (2) comprising:
a trough (4) for holding water;
a water conduit system (6) in fluid communication with the trough (4) and connectable to a water supply (8);
an electric power consuming water level control system (24) comprising a controller (26) and at least one water level sensor (28, 32, 34) that senses a water level in the trough (4); and
an electric power unit comprising an electric generator (36) and an electrically chargeable unit (38),
wherein the water level control system (24) is connected to the electrically chargeable unit (38), and
wherein the electric generator (36) is connected to the water conduit system (6) and, via the water conduit system (6), to the water supply (8), the electric generator (36) being arranged to be driven by water from the water supply (8) to charge the electrically chargeable unit (38).

2. The animal watering device (2) according to claim 1, wherein the water level control system (24) further comprises a timer (30).

3. The animal watering device (2) according to claim 2, wherein the at least one water level sensor (28, 32, 34) comprises a low level sensor (28) that senses a low water level in the trough (4).

4. The animal watering device (2) according to claim 3, wherein the at least one water level sensor (28, 32, 34) further comprises a top level sensor (32) that senses a top water level in the trough (4).

5. The animal watering device (2) according to claim 4, wherein the at least one water level sensor (28, 32, 34) further comprises a middle level sensor (34) that senses a middle water level in the trough (4).

6. The animal watering device (2) according to claim 3, further comprising a water outlet (16) located at a bottom portion (18) of the trough (4), and an outlet valve arrangement (20) associated with the water outlet (16).

7. The animal watering device (2) according to claim 6, wherein the water level control system (24) is arranged to open the water outlet (16) when both a first time interval measured by the timer has expired and a water level in the trough (4) is below the low water level as sensed by the low level sensor (28).

8. The animal watering device (2) according to claim 7, wherein the water level control system (24) is arranged to open the water outlet (16) when a second time interval measured by the timer has expired.

9. The animal watering device (2) according to claim 8, wherein the water level control system (24) is arranged to maintain the water outlet (16) open during a third time interval measured by the timer.

10. The animal watering device (2) according to claim 3, wherein the water conduit system (6) is connected to an inlet nozzle arrangement (10) that adds water to the trough.

11. The animal watering device (2) according to claim 10, wherein the water level control system (24) is arranged to open (112) the inlet nozzle arrangement (10) for rinsing the trough during a draining operation during at least a part of the third time interval.

12. The animal watering device (2) according to claim 10, wherein the water level control system (24) is arranged to open the inlet nozzle arrangement (10) when a water level in the trough (4) is at or below the low water level as sensed by the low level sensor (28).

13. The animal watering device (2) according to claim 5, wherein,
the water conduit system (6) is connected to an inlet nozzle arrangement (10) that adds water to the trough, and
the water level control system (24) is arranged to open the inlet nozzle arrangement (10) when the water level in the trough (4) is at or below the middle water level as sensed by the middle level sensor (34).

14. The animal watering device (2) according to claim 13, wherein the water level control system (24) closes the inlet nozzle arrangement (10) when the water level in the trough (4) is at or above the top water level as sensed by the top level sensor (32).

15. The animal watering device (2) according to claim 6, wherein the outlet valve arrangement (20) comprises a valve body (22) and a hydraulic cylinder (21) connected to the valve body (22).

16. The animal watering device (2) according to claim 15, wherein the valve body (22) comprises a lid (44), the lid (44) opens and closes the water outlet (16) and is maneuvered by the hydraulic cylinder (21).

17. The animal watering device (2) according to claim 16, wherein the water conduit system (6) is connected to the hydraulic cylinder (21).

18. The animal watering device (2) according to claim 1, wherein the electrically chargeable unit (38) is a rechargeable battery.

19. The animal watering device (2) according to claim 1, wherein the trough (4) comprises a bottom portion (18) having a longitudinal direction (40) and the bottom portion (18) is provided with a rib (42) protruding from the bottom portion (18), the rib (42) being provided in a middle portion of the bottom portion (18) and extending substantially in the longitudinal direction (40).

20. The animal watering device (2) according to claim 1, further comprising:
an outlet (16) located at a bottom portion (18) of the trough (4);
an outlet valve arrangement (20) associated with the water outlet (16), the outlet valve arrangement (20) comprising a valve body (22) and an hydraulic cylinder (21) connected to the valve body (22), the valve body (22) comprises a lid (44) that opens and closes the water outlet (16) and is maneuvered by the hydraulic cylinder (21) to open and close the water outlet, the hydraulic cylinder (21) being comprised of a first chamber (52), a second chamber (54), and a piston (43) forming a partition between the first and second chambers (52, 54),
wherein the first chamber (52) is connected, via the water conduit system (6), to the water supply (8) to actuate the outlet valve arrangement (20) and the second chamber (54) is alternatingly connected, via the water conduit system (6), to the water supply (8) to actuate the outlet valve arrangement (20); and
wherein the water level control system (24) is further comprised of a timer (30), and the at least one water level sensor (28, 32, 34) comprises a low level sensor (28) that senses a low water level in the trough (4),
wherein the timer (30) measures a first time interval and a second time interval,
wherein the water level control system (24) is arranged to open the water outlet (16) under a first condition, the first condition being met when both the first time interval has expired and a water level in the trough (4) is at or below the low water level sensed by the low level sensor (28), and
wherein, when failing to meet the first condition, the water level control system (24) is arranged to open the water outlet (16) under a second condition, the second condition being met when the second time interval has expired.

* * * * *